Patented Sept. 1, 1953

2,650,911

UNITED STATES PATENT OFFICE 2,650,911

COPOLYMERS OF VINYLIDENE CYANIDE WITH ALKENYL ESTERS OF MONOBASIC ACIDS

Harry Gilbert, Cuyahoga Falls, Floyd F. Miller and Vernon L. Folt, Akron, Ohio, assignors to The B. F. Goodrich Company, New York, N. Y., a corporation of New York No Drawing. Application February 25, 1950,
Serial No. 146,412

8 Claims. (Cl. 260—78.5)

This invention relates to the preparation of novel copolymers of vinylidene cyanide with certain alkenyl esters of monobasic acids particularly allyl and methallyl esters of such acids, which copolymers are extremely useful in the preparation of filaments and films.

In U. S. Patent 2,476,270, to Alan E. Ardis, and in copending applications, Serial No. 63,434, filed December 3, 1948, now U. S. Patent 2,502,412, and Serial No. 79,712, filed March 4, 1949, now U. S. Patent 2,514,387, novel methods for the preparation of monomeric vinylidene cyanide are disclosed. In another copending application, Serial No. 11,336, filed February 26, 1948, now U. S. Patent 2,589,294, methods for the preparation of useful homopolymers of vinylidene cyanide are disclosed.

Monomeric vinylidene cyanide is a clear liquid at room temperature and a crystalline solid at 0° C. It melts in the range of 6.0° C. to 9.7° C., depending on purity, with purest samples melting at 9.0° C. to 9.7° C., and it boils at 40° C. at a reduced pressure of 5 mm. of mercury. It is quite unstable because of its extreme sensitivity to water, undergoing on contact with water at room temperature an instantaneous homopolymerization reaction to give a solid, water-insoluble resin. When it is allowed to stand at room temperature in admixture with butadiene-1,3, it reacts therewith to give solid 4,4-dicyanocyclohexene.

It has now been discovered that monomeric vinylidene cyanide of the above physical and chemical characteristics will copolymerize with alkenyl esters of monobasic acids in the presence of a free radical catalyst to give new and highly useful copolymers.

Allyl and methallyl esters of monobasic acids such as allyl and methallyl chloride and acetate, polymerize very slowly, if at all, when heated with a peroxide catalyst. If vinylidene cyanide is also present, however, according to this invention, copolymerization occurs quite readily in the presence of peroxygen catalysts to form highly useful resinous copolymers.

The alkenyl esters which are copolymerized with vinylidene cyanide in the practice of this invention are those esters of monobasic acids, either organic or inorganic, with an alcohol of the structure ROH, wherein R is an alkenyl radical containing at least 3 carbon atoms and possessing a methylene ($CH_2$) group attached by a double bond to a carbon atom which is in turn attached to another methylene group. The esters within this class include, for example:

Allyl esters of monobasic inorganic acids, for example, allyl cyanide, allyl chloride, allyl bromide, allyl fluoride, allyl iodide, allyl chlorocarbonate, allyl nitrate, allyl thiocyanate and the like;

Allyl esters of organic monocarboxylic acids of the formula RCOOH wherein R is a hydrocarbon radical preferably containing from 1 to 6 carbon atoms, for example, allyl formate, allyl acetate, allyl propionate, allyl butyrate, allyl valerate, allyl caproate, allyl-3,5,5-trimethylhexoate, allyl benzoate, allyl acrylate, allyl crotonate, allyl oleate, and the like;

Allyl esters of substituted organic monocarboxylic acids, preferably of those acids containing from 1 to 6 carbon atoms, such as allyl chloroacetate, allyl trichloroacetate, allyl chloropropionate, allyl chlorovalerate, allyl lactate, allyl pyruvate, allyl aminoacetate, allyl acetoacetate, allyl thioacetate, and the like;

Methallyl esters corresponding to the above allyl esters as well as other corresponding esters from such alkenyl alcohols as beta-ethyl allyl alcohol, beta-propyl allyl alcohol, 1-buten-4-ol, 2-methyl-buten-1-ol-4, 2(2,2-dimethylpropyl)-1-buten-4-ol, 1-pentene-4-ol and the like; and any other ester of a monobasic acid with an alkenyl alcohol as defined hereinabove.

The catalyst which is utilized in the polymerization is preferably a peroxygen compound such as silver peroxide, the perborates, the percarbonates, benzoyl peroxide, caproyl peroxide, lauroyl peroxide, acetone peroxide, acetyl benzoyl peroxide, cumene hydroperoxide, o,o'-dichlorobenzoyl peroxide, o,o' - dibromobenzoyl peroxide, caprylyl peroxide, pelargonyl peroxide, tertiary butyl hydroperoxide, and the like. In general, from 0.01 to 2.0% by weight (based on the total weight of the monomers charged) of the catalyst is utilized, although smaller or larger amounts may be utilized if desired. By regulating the amount of the catalyst it is possible to control very effectively and accurately the molecular weight of the copolymer. For instance, to obtain a high-molecular weight copolymer, a small quantity of catalyst is used, while lower molecular weight copolymers are obtained by the use of larger amounts of catalyst.

The polymerization itself may be carried out in several different ways. One preferred method consists simply in heating a mixture of the monomers and the polymerization catalyst to a temperature of from about 30° to 80° C., whereupon polymerization occurs to form the desired copolymer as a white resinous powder of small particle size. The copolymer thus formed may be separated from any unpolymerized monomers and the catalyst simply by first adding benzene or other aromatic hydrocarbon to the polymerization mixture to dissolve the remaining monomers and then filtering off the copolymer.

A second method of polymerization consists in dissolving the vinylidene cyanide and the alkenyl ester in benzene or other aromatic solvent such as toluene, methyl toluene, trichloro benzene, or the like, preferably free from impurities which initiate the ionic polymerization of the vinylidene cyanide monomer and in an amount such that the solvent comprises approximately 30 to 80% by weight of the total solution. The polymerization catalyst is included in this solution and the resulting mixture is heated to a temperature of about 30° to 80° C. to effect the polymerization. The copolymer may be separated from the polymerization medium by filtering, or if desired the polymerization medium may be removed by an evaporation process.

The polymerization may be effected at temperatures as low as 20° C. or lower or as high as 100° C. or even higher, although temperatures in the range of 30 to 80° C. are ordinarily preferred.

The respective quantities of alkenyl ester and vinylidene cyanide in any polymerization charge are not critical since a useful copolymer is obtained regardless of the amount of either monomer in the charge, as will be demonstrated in the examples hereinbelow. The amount of vinylidene cyanide in the monomer charge may be as low as 0.1 mole per cent or as high as 99 mole per cent while still obtaining copolymers differing markedly in properties from straight homopolymers of either the alkenyl ester or the vinylidene cyanide.

It is to be understood, of course, that regardless of the polymerization method utilized, the polymerization should be stopped before either of the monomers is entirely consumed, in order that pure copolymer will be obtained. Otherwise, when either of the monomers is completely used up, the product will contain straight polymer resulting from the polymerization of the remaining monomer. Accordingly, it is often desirable to add, continuously or intermittently, fresh quantities of one or both of the monomers, and also of catalyst and solvent if desired, to the polymerization mixture during the course of the polymerization, thus taking fullest advantage of the capacity of the equipment and in effect operating a continuous or semi-continuous process.

The following examples illustrate the preparation of copolymers of vinylidene cyanide with alkenyl esters in accordance with this invention, but are not to be construed as a limitation upon the scope thereof, for there are, of course, numerous possible variations and modifications. In the examples all parts are by weight.

EXAMPLES I TO XII

Twelve copolymers are prepared by mixing together and polymerizing varying amounts of vinylidene cyanide and allyl acetate in the presence of 0.15% by weight of o,o'-dichlorobenzoyl peroxide (based on total monomer weight). The polymerization is carried out in an atmosphere of air and the temperature is maintained at about 50° C. for 7 hours and the mixture is then permitted to cool to room temperature and let stand for a sixteen hour period after which it is again heated for 2 hours at a temperature of 40° C. The solid resinous copolymer which has formed is recovered from the polymerization mixture by adding benzene and then filtering. The charging rates of the two monomers, the mole percent vinylidene cyanide in the charge, the yield of copolymer and the mole percent vinylidene cyanide in the copolymer are given in Table I below:

Table I

| Example | Parts Vinylidene Cyanide | Mole percent Vinylidene Cyanide | Parts Allyl Acetate | Yield of Copolymer (Parts) | Mole percent Vinylidene Cyanide in Copolymer |
|---|---|---|---|---|---|
| I | 0.5 | 1.29 | 49.0 | 0.40 | 52.44 |
| II | 0.5 | 1.29 | 49.0 | 0.48 | 52.57 |
| III | 1.0 | 2.55 | 49.0 | 1.23 | 51.10 |
| IV | 1.0 | 2.55 | 49.0 | 1.32 | 51.01 |
| V | 2.0 | 6.32 | 38.0 | 1.03 | 56.84 |
| VI | 2.0 | 6.32 | 38.0 | 1.15 | 57.77 |
| VII | 4.0 | 12.48 | 36.0 | 1.24 | 59.31 |
| VIII | 3.0 | 18.46 | 17.0 | 0.62 | 61.89 |
| IX | 5.0 | 29.96 | 15.0 | 0.86 | 68.85 |
| X | 5.0 | 56.20 | 5.0 | 0.52 | 74.80 |
| XI | 7.5 | 79.83 | 2.5 | 0.57 | 78.40 |
| XII | 9.0 | 92.03 | 1.0 | 0.60 | 78.47 |

EXAMPLES XIII to XX

Allyl caproate and vinylidene cyanide are copolymerized by the method disclosed in Examples I to XII, except that the mixtures are heated at 50° C. for 6½ hours and then cooled to room temperature and let stand for 16 hours with no further heating being carried out. Solid resinous copolymers are again obtained. The pertinent data are set forth in Table II below.

Table II

| Example | Parts Vinylidene Cyanide | Mole percent Vinylidene Cyanide | Parts Allyl Caproate | Yield of Copolymer (Parts) | Mole percent Vinylidene Cyanide in Copolymer |
|---|---|---|---|---|---|
| XIII | 1.0 | 3.92 | 49.0 | 0.84 | 62.08 |
| XIV | 1.0 | 3.92 | 49.0 | 0.75 | 62.09 |
| XV | 2.0 | 9.53 | 38.0 | 0.89 | 68.90 |
| XVI | 4.0 | 18.20 | 36.0 | 1.03 | 71.52 |
| XVII | 3.0 | 26.11 | 17.0 | 1.24 | 73.87 |
| XVIII | 5.0 | 40.03 | 15.0 | 1.39 | 75.63 |
| XIX | 5.0 | 66.70 | 2.0 | 0.88 | 78.84 |
| XX | 7.5 | 85.73 | 2.5 | 0.89 | 82.06 |

EXAMPLES XXI to XXXI

A series of solid resinous allyl formate: vinylidene cyanide copolymers are prepared according to the method of Examples XIII to XX. The monomer charging rates, yield of copolymer, and mole percent vinylidene cyanide in the copolymer (as determined by nitrogen analysis) are recorded in Table III.

Table III

| Example | Parts Vinylidene Cyanide | Mole percent Vinylidene Cyanide | Parts Allyl Formate | Yield of Copolymer (Parts) | Mole percent Vinylidene Cyanide in Copolymer |
|---|---|---|---|---|---|
| XXI | 0.5 | 1.12 | 49.0 | 0.33 | 54.51 |
| XXII | 0.5 | 1.12 | 49.0 | 0.26 | 53.13 |
| XXIII | 1.0 | 2.19 | 49.0 | 0.67 | 55.81 |
| XXIV | 1.0 | 2.19 | 49.0 | 0.83 | 55.81 |
| XXV | 2.0 | 5.48 | 38.0 | 1.18 | 58.37 |
| XXVI | 2.0 | 5.48 | 38.0 | 1.13 | 58.34 |
| XXVII | 4.0 | 10.92 | 36.0 | 1.30 | 60.75 |
| XXVIII | 3.0 | 16.32 | 17.0 | 0.18 | 65.0 |
| XXIX | 5.0 | 26.89 | 15.0 | 0.2 | 67.92 |
| XXX | 7.5 | 76.84 | 2.5 | 0.59 | 77.10 |
| XXXI | 9.0 | 90.86 | 1.0 | 0.69 | 80.24 |

EXAMPLES XXXII to XXXIV

Vinylidene cyanide and methallyl chloride are mass polymerized in the presence of o,o'-dichlorobenzoyl peroxide and at a temperature of about 40° C., the polymerization being stopped after 16 hours by cooling. Upon the addition of benzene the copolymer precipitates as a hard, resinous solid. The pertinent data are shown in Table IV.

Table IV

| Example | Parts Vinylidene Cyanide | Mole Percent Vinylidene Cyanide | Parts Methallyl Chloride | Parts Catalyst | Mole Percent Vinylidene Cyanide in Copolymer |
|---|---|---|---|---|---|
| XXXII | 1.96 | 10 | 20.5 | 0.045 | 48.2 |
| XXXIII | 3.92 | 30 | 10.6 | 0.029 | 65.1 |
| XXXIV | 3.92 | 90 | 0.506 | 0.009 | 74.0 |

EXAMPLES XXXV to XXXVII

Vinylidene cyanide and allyl chloride are copolymerized by dissolving the monomers in benzene, adding o,o'-dichlorobenzoyl peroxide as the catalyst and heating the resulting solution at about 50° C. for 46 hours, after which the copolymer is recovered in the form of a resinous solid by filtering. The charging ratios and copolymer compositions are given in Table V.

Table V

| Example | Parts Vinylidene Cyanide | Mole Percent Vinylidene Cyanide | Parts Allyl Chloride | Parts Catalyst | Parts Benzene | Mole Percent Vinylidene Cyanide Copolymer |
|---|---|---|---|---|---|---|
| XXXV | 1.96 | 30 | 6.94 | 0.0077 | 19.26 | 51 |
| XXXVI | 3.92 | 50 | 4.48 | 0.0064 | 23.24 | 59 |
| XXXVII | 3.92 | 70 | 3.84 | 0.0078 | 16.73 | 67 |

EXAMPLES XXXVIII to XLI

Vinylidene cyanide and allyl cyanide are copolymerized by mixing the monomers in various proportions, adding 0.15% by weight based on total monomers of o,o'-dichlorobenzoyl peroxide as polymerization catalyst and maintaining the mixture in an air atmosphere at 22° C. for varying lengths of time. The copolymer formed is then separated from the polymerization mixture by addition of benzene and filtering. In each case a resinous copolymer containing about 85 weight per cent of copolymerized vinylidene cyanide is obtained. The following Table VI presents the weight per cent vinylidene cyanide in the monomer charge, the time of polymerization and the per cent monomer to polymer conversion:

Table VI

| Example | Weight Percent Vinylidene Cyanide in Charge | Time | Conversion (Percent) |
|---|---|---|---|
| XXXVIII | 5 | 90 minutes | 3.8 |
| XXXIX | 10 | 210 minutes | 4.9 |
| XL | 15 | 360 minutes | 15.1 |
| XLI | 25 | 48 hours | 25.7 |

When other alkenyl esters of the type disclosed hereinabove are substituted for allyl acetate, allyl caproate, allyl formate, allyl chloride, methallyl chloride, and allyl cyanide in the above examples, copolymers are obtained which have properties generally equivalent to the copolymers of the examples. Also, when the polymerization is carried out according to the other methods described hereinabove, or using other of the peroxygen catalysts disclosed, excellent results are achieved.

The copolymers of this invention are useful in the preparation of solutions from which can be spun filaments of any desired size having many valuable properties including high strength, low elongation and excellent resistance to weathering and to the action of a large number of chemicals. For instance, when the copolymers obtained in the above examples are dissolved in dimethyl formamide, viscous solutions result, and such solutions are suitable for being spun through a spinneret into a spinning bath to give filaments. The physical properties of these filaments are excellent and can be further improved by a "hot-stretching" process, whereby the filament is stretched in a hot zone in a series of steps, a process disclosed in a copending application, Serial No. 113,018, filed August 29, 1949. In addition to the use of dimethyl formamide, other solvents for the copolymer may also advantageously be used, and the copolymer solutions are also useful in the preparation of excellent films.

Although specific examples of the invention have been herein described, it is not intended to limit the invention solely thereto, but to include all of the variations and modifications falling within the spirit and scope of the appended claims.

We claim:

1. A copolymer of vinylidene cyanide and an ester of a mono-basic acid with an alcohol selected from the class consisting of allyl and metallyl alcohols, the vinylidene cyanide in said copolymer being derived from monomeric vinylidene cyanide which is a liquid at room temperature and a crystalline solid at 0° C., having a melting point when in purest form of substantially 9.0° C. to 9.7° C. and being characterized chemically by the ability to undergo on contact with water at room temperature an instantaneous homopolymerization reaction to give a solid, water-insoluble resin, said copolymer resulting from the polymerization of a mixture consisting of vinylidene cyanide and said ester, said mixture containing from 0.1 to 99 mole per cent of vinylidene cyanide.

2. A copolymer of vinylidene cyanide and allyl formate, the vinylidene cyanide in said copolymer being derived from monomeric vinylidene cyanide which is a liquid at room temperature and a crystalline solid at 0° C., having a melting point when in the purest form of substantially 9.0° C. to 9.7° C. and being characterized chemically by the ability to undergo on contact with water at room temperature an instantaneous homopolymerization reaction to give a solid, water-insoluble resin, said copolymer resulting from the polymerization of a mixture consisting of vinylidene cyanide and allyl formate, said mixture containing from 0.1 to 99 mole per cent of vinylidene cyanide.

3. A copolymer of vinylidene cyanide and allyl acetate, the vinylidene cyanide in said copolymer being derived from monomeric vinylidene cyanide which is a liquid at room temperature and a crystalline solid at 0° C., having a melting point when in the purest form of substantially 9.0° C. to 9.7° C. and being characterized chemically by the ability to undergo on contact with water at room temperature an instantaneous homopolymerization reaction to give a solid, water-insoluble resin, said copolymer resulting from the polymerization of a mixture consisting of vinylidene cyanide and allyl acetate, said mixture containing from 0.1 to 99 mole per cent of vinylidene cyanide.

4. A copolymer of vinylidene cyanide and allyl caproate, the vinylidene cyanide in said copolymer being derived from monomeric vinylidene cyanide which is a liquid at room temperature and a crystalline solid at 0° C., having a melting point when in the purest form of substantially 9.0° C. to 9.7° C. and being characterized chemically by the ability to undergo on contact with water at room temperature an instantaneous homopolymerization reaction to give a solid, water-insoluble resin, said copolymer resulting from the polymerization of a mixture consisting of vinylidene cyanide and allyl caproate, said mixture containing from 0.1 to 99 mole per cent of vinylidene cyanide.

5. A copolymer of vinylidene cyanide and allyl chloride, the vinylidene cyanide in said copolymer being derived from monomeric vinylidene cyanide which is a liquid at room temperature and a crystalline solid at 0° C., having a melting point when in the purest form of substantially 9.0° C. to 9.7° C. and being characterized chemically by the ability to undergo on contact with water at room temperature an instantaneous homopolymerization reaction to give a solid, water-insoluble resin, said copolymer resulting from the polymerization of a mixture consisting of vinylidene cyanide and allyl chloride, said mixture containing from 0.1 to 99 mole per cent of vinylidene cyanide.

6. A copolymer of vinylidene cyanide and allyl cyanide, the vinylidene cyanide in said copolymer being derived from monomeric vinylidene cyanide which is a liquid at room temperature and a crystalline solid at 0° C., having a melting point when in the purest form of substantially 9.0° C. to 9.7° C. and being characterized chemically by the ability to undergo on contact with water at room temperature an instantaneous homopolymerization reaction to give a solid, water-insoluble resin, said copolymer resulting from the polymerization of a mixture consisting of vinylidene cyanide and allyl cyanide, said mixture containing from 0.1 to 99 mole per cent of vinylidene cyanide.

7. The method which comprises preparing a liquid medium containing monomeric vinylidene cyanide, which is a liquid at room temperature and a crystalline solid at 0° C., having a melting point when in purest form of substantially 9.0° C. to 9.7° C. and being characterized chemically by the ability to undergo on contact with water at room temperature an instantaneous homopolymerization reaction to give a solid, water-insoluble resin, and an ester of a monobasic acid with an alcohol selected from the class consisting of allyl and methallyl alcohols, and adding a peroxygen catalyst, maintaining the liquid at a temperature of about 20° C. to 80° C. for a time sufficient to effect copolymerization of the said vinylidene cyanide and said ester and precipitation of a solid resinous copolymer of vinylidene cyanide with said ester.

8. The method of claim 7 further characterized in that the liquid medium consists of vinylidene cyanide and said ester dissolved in benzene and the peroxygen catalyst is o,o'-dichlorobenzoyl peroxide.

HARRY GILBERT.
FLOYD F. MILLER.
VERNON L. FOLT.

References Cited in the file of this patent
UNITED STATES PATENTS

| Number | Name | Date |
|---|---|---|
| 2,396,785 | Hanford | Mar. 19, 1946 |
| 2,466,395 | Dickey | Apr. 5, 1949 |
| 2,476,270 | Ardis | July 19, 1949 |